(12) United States Patent
Faraj

(10) Patent No.: US 6,345,108 B1
(45) Date of Patent: Feb. 5, 2002

(54) MULTIVARIABLE STATISTICAL METHOD FOR CHARACTERIZING IMAGES THAT HAVE BEEN FORMED OF A COMPLEX ENVIRONMENT SUCH AS THE SUBSOIL

(75) Inventor: Abdelaziz Faraj, Rueil-Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/206,984

(22) Filed: Dec. 8, 1998

(30) Foreign Application Priority Data

Dec. 10, 1997 (FR) ............................................ 97 15742

(51) Int. Cl.$^7$ ................................................. G06K 9/00
(52) U.S. Cl. ...................... 382/109; 382/100; 73/152.1; 367/59
(58) Field of Search ................................. 382/109, 100, 382/108, 101, 113; 348/669; 356/241.1; 73/152.01, 784; 367/59

(56) References Cited

U.S. PATENT DOCUMENTS

| | | | |
|---|---|---|---|
| 4,918,739 A | * 4/1990 | Lorente et al. ................. 382/1 |
| 5,038,378 A | * 8/1991 | Chen ........................... 382/109 |
| 5,129,268 A | * 7/1992 | Uesugi et al. ................. 73/865 |
| 5,148,494 A | * 9/1992 | Keskes ........................... 382/1 |
| 5,691,957 A | * 11/1997 | Spiesberger .................... 367/3 |
| 5,719,949 A | * 2/1998 | Koeln et al. ................. 382/113 |
| 5,875,003 A | * 2/1999 | Kato et al. ................... 348/669 |
| 5,884,229 A | * 3/1999 | Matteucci ..................... 702/14 |
| 6,075,752 A | * 6/2000 | De Bazelaire ................ 367/59 |

OTHER PUBLICATIONS

"A contiguity–enhanced k–means clustering algorithm for unsupervised multispectral image segmentation" by J. Theiler et al, appearing in Algorithms, Devices, and Systems for Optical Information Processing, San Diego, Ca., USA, 28–29, Jul. 1997, vol. 3519, pp. 108–118.

"Probabilistic classification of forest structures by hierarchical modelling of the remote sensing process" by J. Moffett et al, appearing in Statistical and Stochastic Methods in Image Processing II, San Diego, Ca., USA, 31, Jul.–Aug. 1997, vol. 3167, pp. 118–129.

* cited by examiner

Primary Examiner—Leo Boudreau
Assistant Examiner—M. B. Choobin
(74) Attorney, Agent, or Firm—Antonelli, Terry, Stout & Kraus, LLP

(57) ABSTRACT

The invention is a statistical method for analyzing exploration data associated with image elements showing physical properties of a complex environment such as subsoil for identifying the spatial relations between image elements. The method comprises successive identification of the spatial structures of the data, separation of these spatial structures with removal of possible redundancies, formation, from initial images, of synthetic images or spatial components that show the spatial structures of the data, providing a typology of the initial images according to the spatial structures shown by the spatial components, and filtering of the initial images in order to suppress the noise and to select one or more identified spatial structures. The method can be used for study of any spatial data, notably in geosciences in order to process seismic images of the subsoil, but also in geography, agronomy, hydrology, geomarketing, etc.

48 Claims, 17 Drawing Sheets

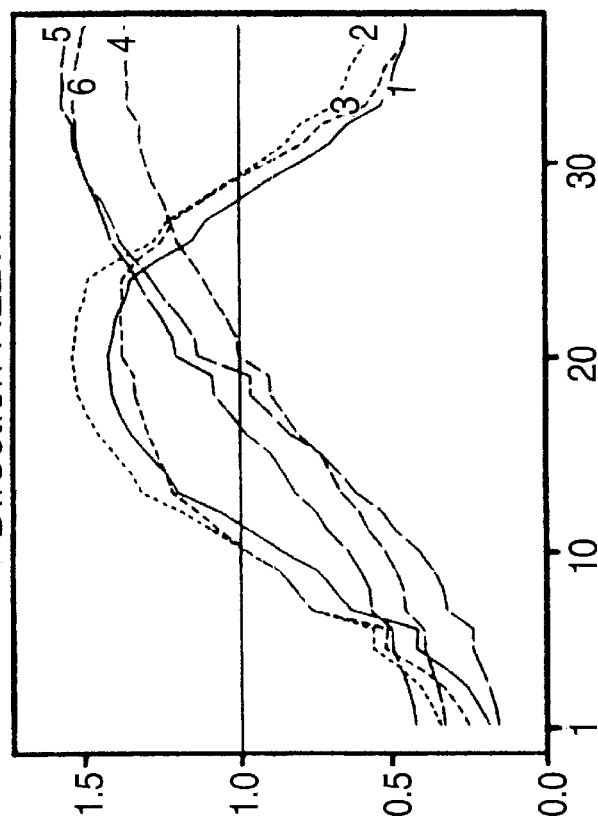
FIG. 2a Direction N—S
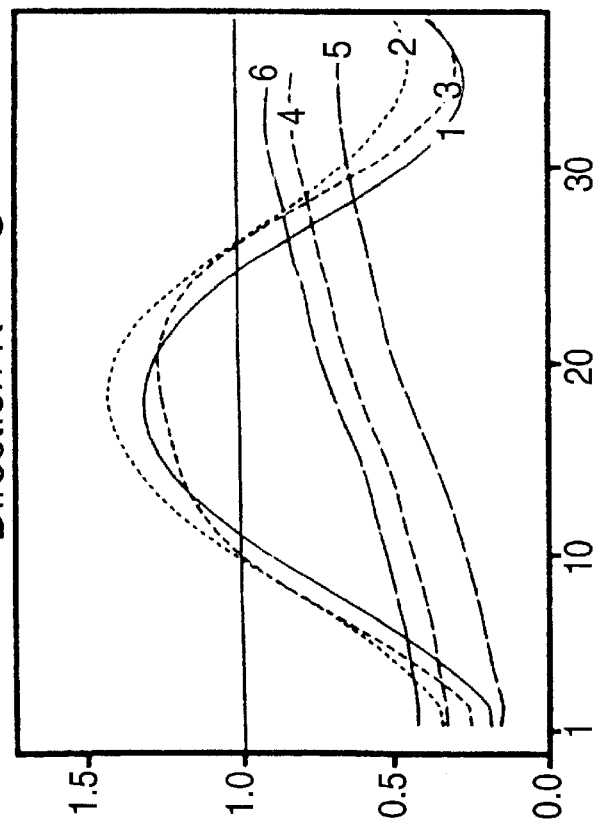
FIG. 2b Direction N22W

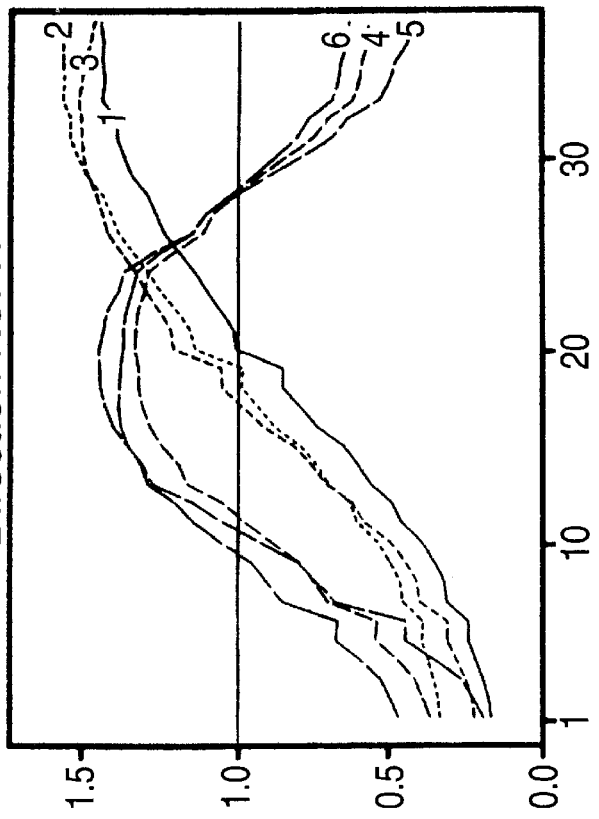
FIG. 2d Direction N67W
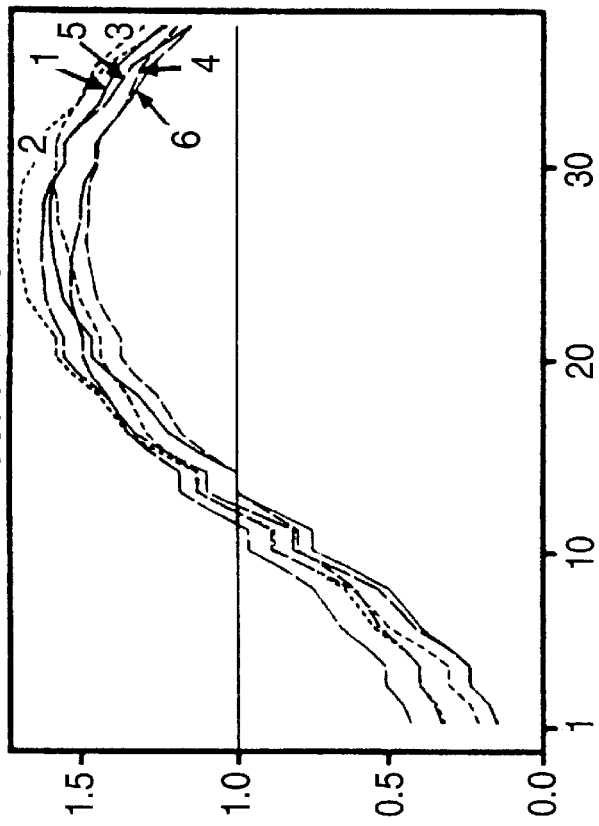
FIG. 2c Direction N45W

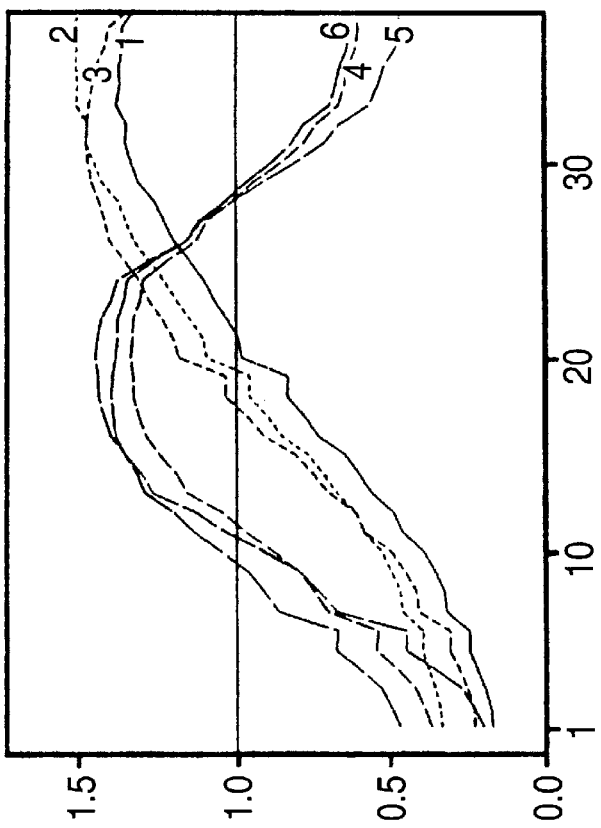
FIG. 2f Direction N67E
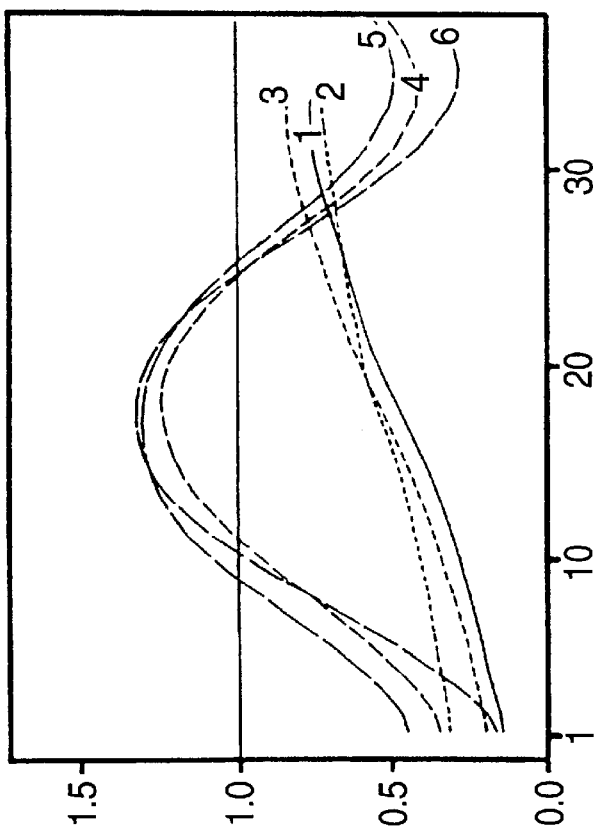
FIG. 2e Direction E-W

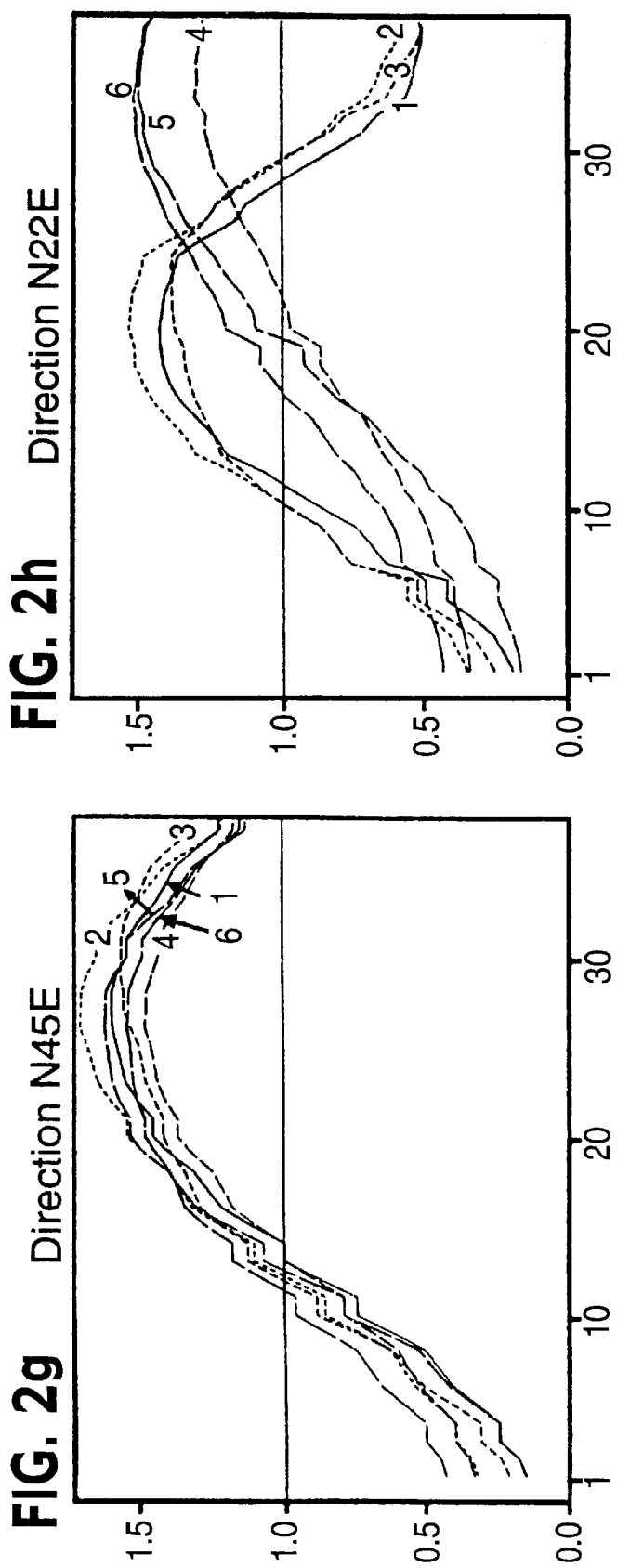

IMG1

IMG2  2  3----4----5----6----7----8----9

IMG3

MULTIVARIABLE STATISTICAL METHOD FOR CHARACTERIZING IMAGES THAT HAVE BEEN FORMED OF A COMPLEX ENVIRONMENT SUCH AS THE SUBSOIL

BACKGROUND OF THE INVENTION

1. Field of the Invention

The present invention relates to a multivariable statistical method for analyzing images that have been formed of a complex environment such as subsoil for identifying spatial relations between elements of the structure of the environment.

2. Description of the Prior Art

Spatial contiguity analysis (SCA) has been the subject of many publications, notably by:

L. Lebart, 1969, Analyse statistique de la contiguïté, Pub. Ins. Stat., Paris VIII, 81–112.

Under the designation "spatial proximity analysis", spatial contiguity analysis has been applied notably for seismic data filtering as described by:

Royer, J. J., 1984, Proximity Analysis: a Method for Geodata Processing, in Sciences de la Terre, n° 20, Proc. of the Int. Coll.: Computers in Earth Sciences for Natural Resources Characterization, April 9–13, Nancy, France, or by Faraj, A., 1994, Application of Spatial Contiguity Analysis to Seismic Data Filtering. In SEC—$64^{th}$ Annual International SEG Meeting, Los Angeles, October. 23018 1994, Expanded abstracts, vol. 1, Paper SP5.7, 15841587.

Spatial contiguity analysis computes a family of linear combination components of the initial variables which minimize the contiguity coefficient known as Geary's coefficient defining the ratio of the spatial variability to the variance.

The components (referred to as spatial components) correspond to the eigenvectors of the matrix $C^{-1}\Gamma(h)$, where C is the variance-covariance matrix of the initial data and $\Gamma(h)$ that of the variograms-crossed variograms at the spatial distance h. The spatial components are usually arranged in descending order of the eigenvalues of this matrix.

Generally first components (associated with the low eigenvalues), referred to as regional components, represent the large-scale spatial structures. The last spatial components (associated with the high eigenvalues), referred to as local components, relate to the small-scale spatial structures.

The information "borne" by these various components is measured by the associated eigenvalues.

The methodology followed for spatial contiguity analysis is directly modelled on the well-known principal-components analysis (PCA). It has however been observed that the eigenvalues of matrix $C^{-1}\Gamma(h)$ are poor measurements of the local variance for analyzing and arranging the spatial components. In fact, during certain analyses, the components associated with the highest eigenvalues are totally meaningless (random noise for example), whereas those corresponding to intermediate eigenvalues seem to better account (at least visually) for both the statistical and the spatial information of the initial variables.

In reality, although calculated from matrices C and $\Gamma(h)$ which include both the statistical and spatial interdependences of the data and although measuring the contiguity relations of the factorial components, the eigenvalues represent each an isolated piece of information (ratio of the local variance to the global variance) specific to the spatial component. The eigenvalue is a criterion that is good only for measuring the spatial variability of the spatial component. Unlike the principal-components analysis (PCA) for example, where the eigenvalues (of C) represent the part of the total variance of the data explained by the component, the sum of the eigenvalues obtained with the SCA, which is $\text{tr}[C^{-1}\Gamma(h)]$, is meaningless. On the other hand, it is preferable to obtain $\text{tr}[\Gamma(h)]$ because it represents the sum of the local variances of the initial variables. It is therefore necessary to define new criteria in order to quantify the statistical and spatial information borne by the spatial components of the SCA.

SUMMARY OF THE INVENTION

It is a multivariable statistical method for analysing data associated (directly or indirectly) with image elements showing physical properties of a complex environment, these images being obtained by exploration of the environment (by means of seismic waves for example) so as to highlight the spatial relations between these elements. The method comprises:

spatial analysis of the data in order to show the spatial properties of events in at least one direction;

application to the data of a spatial contiguity analysis technique in order to best split the data into component spatial structures, and filtering of the component spatial structures obtained by splitting in order to extract the most pertinent spatial structures.

The method comprises:

identifying the component spatial structures of the data, separating the spatial structures including eliminating possible redundancies, forming, from the initial images, of synthetic images or spatial components showing the spatial structures of the data, marking a typology of the initial images according to the spatial structures shown by the spatial components, and filtering of the initial images in order to suppress noise and to select at least one identified spatial structures.

The spatial structure of the data is for example determined by a single variable or a pair variables analysis of different variograms of the image elements.

Selection of the component spatial structures is achieved for example by determining the respective contributions thereof to the spatial variability of the data and to the variance of the data, and this selection can be achieved graphically.

The method allows identification of the spatial structures as well as quantification of the filtered information in terms of variance and of spatial variability.

In a general way, the method can be applied to the analysis of any evenly or unevenly distributed spatial data.

BRIEF DESCRIPTION OF THE DRAWINGS

Other features and advantages of the method according to the invention will be clear from reading the description hereafter which comprises two parts, the first part relating to the broad lines of the method and the second to the statistical tools used to carry out the various stages of the analysis, and with reference to the accompanying drawings wherein:

FIGS. 2a to 2h show the variogram curves of six images Z1 to Z6 of the block selected in eight directions.

DETAILED DESCRIPTION OF THE METHOD ACCORDING TO THE INVENTION

Figure 1A:
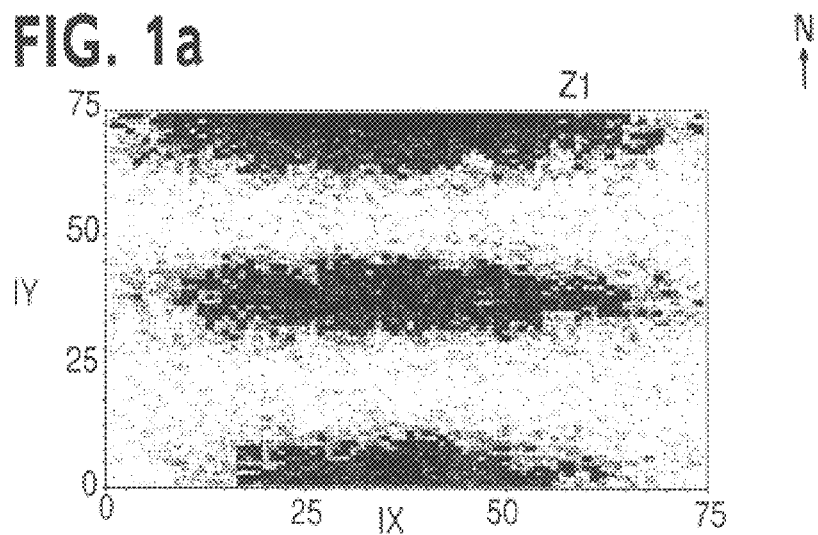
FIGS. 1a to 1f show images of six horizons Z1 to Z6 of a seismic block.
Figure 1B:
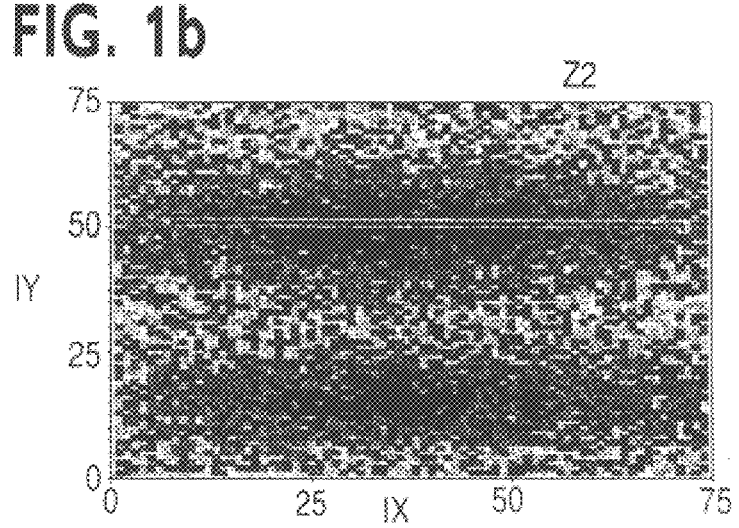
Figure 1C:
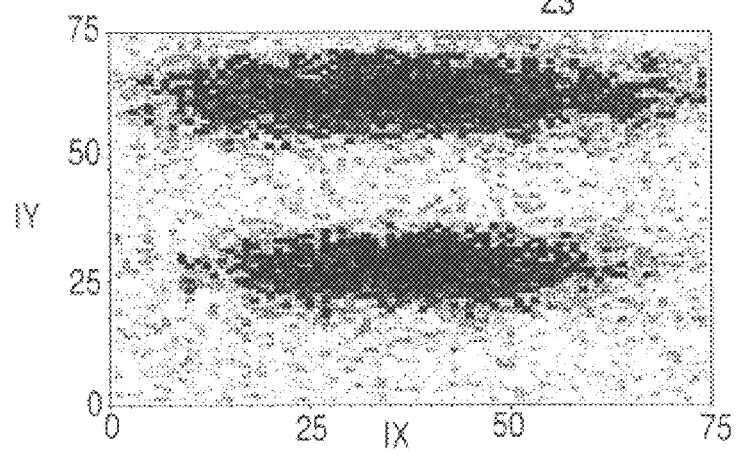
Figure 1D:
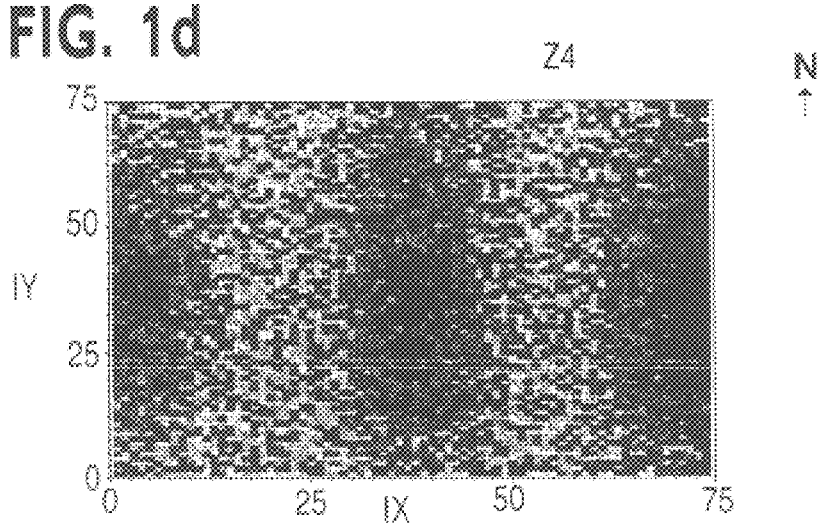
Figure 1E:
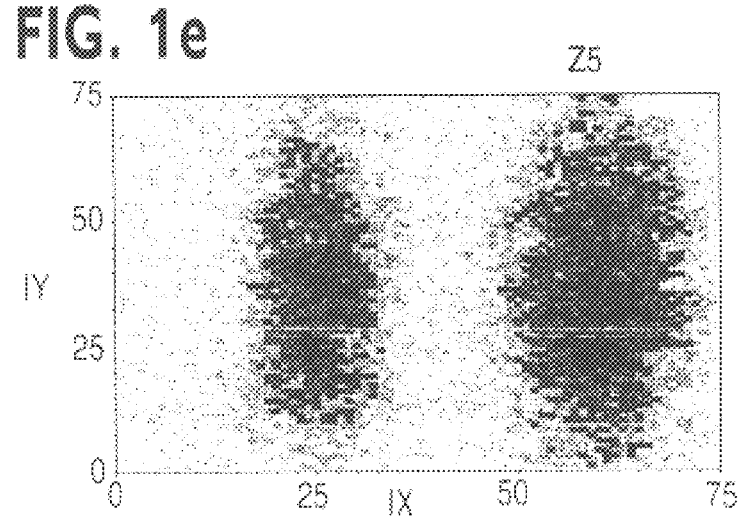
Figure 1F:
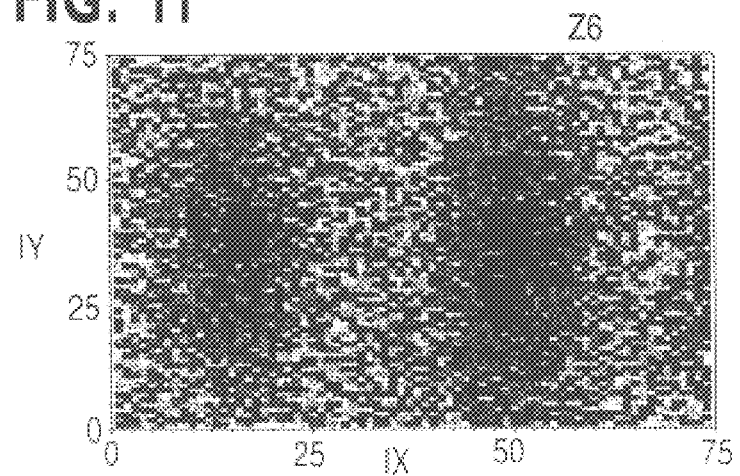

The method of the invention is applied to the data associated with the various image elements obtained by seismic exploration, which are to be analysed in order to highlight the spatial contiguity relations therebetween. These images are for example extracted from the horizons or the seismic sections of a 3D "seismic cube". It mainly comprises three successive stages.

I-1 Spatial Analysis

Referred to as variographic study, this preliminary stage performs a spatial analysis of the data, either monovariable (one variable at a time) or bivariable (i.e. by taking the variables two by two). It is during this stage that the spatial properties of the initial variables in the various directions are shown: their spatial arrangement on various scales, the respective extent of the random noise in the various images, the possible existence of periodic structures, etc.

Monovariable variographic analysis of the data (or initial variables) analyses the curves of the variograms and of the autocorrelations, the surface variograms and autocorrelograms associated with each initial variable and in comparing them with each other in order to bring out particular spatial behaviors.

Bivariable variographic analysis of the data analyses the curves of the crossed variograms and of the crosscorrelations, the surface crossed variograms and crosscorrelograms associated with the initial variables taken two by two, in order to bring out the spatial correlations of the variables with each other.

This (monovariable or bivariable) variographic study is first a descriptive stage whose main point is to classify the initial variables in homogeneous spatial behavior groups rather than to model the variogram curves. The different variographic tools used: variograms, crossed variograms, directional or surface autocorrelations and crosscorrelations, are computed and visualized for the entire family of the variables analysed. This variographic study can show pertinent spatial distances.

I-2 Application of the Spatial Contiguity Analysis (SCA)

This preliminary preparation being done, one or more spatial contiguity analyses are then performed on the data, in order to find the best split thereof into orthogonal spatial structures. It is during this stage that it is possible for the user to use the data and resultant available interpretation aid tools.

One or more analyses are applied to the data. The user is guided for the implementation of these analyses by the spatial distances obtained during the previous variographic analysis.

Diagrams

The relevance of the spatial components resulting from a given analysis is shown by two diagrams: the diagram relative to the contributions of the spatial components to the spatial variability of the data and that of the contributions of the spatial components to the variance of the data. These two diagrams show the distribution of the two criteria in question (contributions to the spatial variability defined hereafter (see relation (17)) and contributions to the variance: (see relation (19)) for all the spatial components of an analysis. These diagrams allow selection of the most significant components in terms of spatial variability and or of variance.

The spatial components are arranged in the two following orders:

1) in descending order of their contribution to the spatial variability of the data (see relation (20)). What is referred to as local spatial components are the first components of this order because they account for the small-scale structure of the data, 2) in descending order of their contribution to the variance of the data (see relation (21)). What is referred to as regional spatial components are the first components of this order because they account for the large-scale structure of the data.

Graphs

To analyse the initial variables in connection with the spatial components, two variable representations are possible and complementary:

1) Those of the signed contributions of the spatial components to the spatial variability of the initial variables (see relation (15)). Such values, ranging between −1 and +1, give circles (called circles of contributions to the spatial variability) within which the initial variables are represented by dots.

2) Those of the signed contributions of the spatial components to the variance of the initial variables (see relation (18)). Such values, ranging between −1 and +1, give circles (called circles of contributions to the variance) within which the initial variables are represented by dots.

These two complementary graphical representations allow interpretation of the initial variables in connection with the spatial structures shown off by the components.

These graphical representations (correlation and contribution circles) can also be used to juxtapose the active variables and additional variables, i.e. variables which, unlike the latter, do not come into play for identification of the spatial components, thanks to their signed contributions (relations (15) and (18)). It may be, for example, a seismic attribute that the user wants to position during analysis in relation to the seismic attributes that are involved in the analysis.

I-3 Variables Filtering

The final stage is the stage of filtering of the initial variables or of the variables that are not taken into account for identification of the spatial components, where the user can extract the structure(s) considered to be relevant in the light of the aid tools and of the user's expertise in the field.

This stage suppresses the noise and eliminates or keeps one or more identified spatial structures. The result is a noise-free initial image or an image containing only the (local or regional) structure considered as geologically pertinent by the user. Other filterings are possible, depending on the local or regional components decided as such by the user.

This filtering can be applied to the initial variables as well as to variables that are not involved in the calculations. The user can position these variables in relation to the spatial structures shown by elimination or extraction of these structures.

I-4 Quantification of the Filtered Structures

The method according to the invention offers the user a quantification of the spatial structures eliminated or extracted from the (active and additional) variables both in terms of spatial variability and of variance, because the measurements obtained by relations (22) or (23) are percentages.

Analytic Description of the Statistical Analysis Used

Reminder: For better understanding of what follows, the notions and notations known to the man skilled in the art will first be reminded.

Consider n objects (i=1 to n) situated at points $x_i$ on a position plane and described by J variables $Z^j$ (j=1 to J) so that $Z_i^j$ is the measurement of variable $Z^j$ on the object i. $Z=[Z_i^j]$ is the matrix of the data.

In conventional data analysis, such data are considered as variables (in the statistical sense) defined on a collection of individuals. The n measurements $Z_i^j$ are realisations which are independent of the random variable $Z^j$. This representation rids the data of the spatial character thereof.

In geostatistics, such data are usually represented by a set of regionalized variables (V.R.) considered as realizations of a family $Z(x)=\{Z^j(x); j=1, \ldots, J\}$ of random functions of point x. (i.e. Z(x) is a vector random function with values in $R^J$). Thus, $Z^j(x_i)$, that is denoted by $Z_i^j$, is a realizations of the random function $Z^j(x)$ of point x. The n multidimensional measurements $(Z^1(x_i), Z^2(x_i), \ldots, Z^J(x_i))$ are thus realizations of n different random vectors situated at the points $x_i$ of the position plane.

The term "regionalized" has been proposed to describe a phenomenon that spreads in space and exhibits a certain structure. A regionalized variable is considered as an irregular function of point x since it shows two contradictory aspects:

- one, which is structured, associated with a more or less large-scale spatial arrangement,
- the other, local, showing irregularities on a smaller scale, unpredictable from one point to another.

Between these two extreme aspects of the signal, there are other structures describing spatial arrangements of the data on intermediate scales. It is all of these structures that are described first by means of the geostatistical tools.

These structures, owing to the multidimensional aspect of the data, can be redundant insofar as they would be common to the J initial variables. Once shown, they can be used to achieve a statistical and spatial typology of these variables.

II-1 Implementation of the Spatial Analysis

A direction is selected on the data position plane and a distance is considered in this direction. Both this distance (which is a scalar) and the vector (of dimensions 2) defined by the direction and the length h are denoted by h. The multivariable increase of Z between points x and x+h separated by the distance h in the predetermined direction is denoted by $$\Delta Z(h)=Z(x+h)-Z(x) \quad (1).$$

Z is assumed to be stationary of order 2, which means that the increase $\Delta Z(h)$ has a zero average—i.e. $E[\Delta Z(h)]=0$—and a constant variance $E[\Delta Z(h)^2]$ only depending on h. Under such conditions, the matrix $\Gamma_{ZZ}(h)$ of the variograms-crossed variograms is defined as the matrix of the variances-covariances of the increases $\Delta(h)$:

$$\Gamma_{ZZ}(h)=\tfrac{1}{2}E[\Delta Z(h)^t.\Delta Z(h)]=\tfrac{1}{2}C_{\Delta Z}(h)\Delta Z(h) \quad (2)$$

where $C_{\Delta Z(h)\Delta Z(h)}$ is the matrix of the variances-covariances associated with the columns of $\Delta Z(h)$.

$\Gamma_{ZZ}(h)$ is a matrix of dimension J×J of general term:

$$\gamma_{jj'}(h)=\tfrac{1}{2}E[(Z^j(x+h)-Z^j(x)).(Z^{j'}(x+h)-Z^{j'}(x))] \quad (3)$$

The direction on the data position plane being set, the diagonal term of $\Gamma_{ZZ}(h)$ then designates the semivariogram of $Z^j$ whose value measures the spatial variability of $Z^j$ at the distance h. The experimental variogram is used as a curve depending on distance h. It could also be written in the following form:

$$\gamma_j(h) = \gamma_{jj}(h) = \frac{1}{2m(h)} \sum_{d(i,i')=h} (Z_i^j - Z_{i'}^j)^2 \quad (4)$$

where m(h) is the number of pairs consisting of individuals that are spatially h apart.

The term $\gamma_{jj'}(h)$ denotes, in a certain way, the local covariance between variables j and j' if we consider as the associated contiguity graph the graph which relates the pairs of points that are h apart and arranged in the direction of vector h.

Similarly, $\gamma_j(h)$, the local variance term of variable j, represents a restriction of the variance of this variable only calculated for the pairs that are h apart. It represents the spatial fluctuations associated with this distance. Considered as a curve depending on h, the shape of $\gamma_j$ (FIG. 2) gives information about the spatial behavior of variable $Z^j$ for the different values of h.

The object of a conventional variographic study is to model experimental variograms by means of spherical or exponential basic theoretical models. It also has the advantage, from a practical point of view, of showing the imbricated spatial structures of a regionalized variable. An example of such a variographic study is for example described by:

Isaaks, E. H., Srivastava, R. M., 1989, Applied Geostatistics, Oxford University Press, Oxford.

Within the scope of the present method, show spatial behavior groups are shown by comparing the variograms of the J variables with each other in order to reveal spatial structure families and to determine the suitable distance(s) for implementation of the SCA.

II-2 Implementation of the Spatial Contiguity Analysis (SCA)

The spatial contiguity analysis (SCA) secondly allows showing of the spatial structures, to interpret and possibly to filter them. In fact, one tries to "capture" such structures by means of the factorial components of the SCA.

The spatial distance h between individuals or objects being set in a given direction, a variable f depending on h is to be determined $$f = Zu = \sum_j u_j Z^j \quad (5)$$

which is a linear combination of the initial variables $Z^j$ whose spatial contiguity ratio for interval h has a maximum value. This variable is that which realizes the maximum of the expression:

$$\frac{\gamma_f(h)}{\sigma_f^2} = \frac{u^t \Gamma_{zz}(h)u}{u^t C_{zz} u} \qquad (6)$$

i.e. which has both a maximum spatial variability and a minimum variance. In this expression, $C_{ZZ}$ denotes the matrix of the variances-covariances of the data.

There are J variables $f^1, \ldots, f^\alpha, \ldots, f^J$ solutions to this problem (called spatial components) corresponding to the eigenvectors $u^1, \ldots, u^\alpha, \ldots, u^J$ of matrix $C_{ZZ}^{-1}\Gamma_{ZZ}(h)$—where $u^\alpha = (u_1^\alpha, u_2^\alpha, \ldots, u_J^\alpha)^t \in R^J$—arranged in ascending eigenvalues:

$$\lambda_1 \leq \ldots \leq \lambda_\alpha \leq \lambda_J \qquad (7)$$

$\lambda_\alpha$ measures Geary's contiguity ratio $$\frac{\gamma_f(h)}{\sigma^2(f)}$$

(known to specialists) of the $\alpha$th factorial component.

It is in this order that the components of a conventional factorial analysis are usually presented, putting the main information of the data forward (in the sense of the optimized criterion). Most of the information is thus borne by the first components. This draws a parallel between the components of the SCA (large-scale structures on the first components and microstructures or random noise on the last ones) and those, for example, of the principal-components analysis (greater variance on the first components and random noise on the last ones).

Statistical and Spatial Properties of the SCA Spatial Components

Geary's coefficient $$\frac{\gamma_f(h)}{\sigma^2(f)}$$

combines two criteria: a spatial criterion at the numerator and an algebraic (or statistical) criterion at the denominator, thus allowing calculation of maximum variance and minimum spatial variability factorial components. These components have the property of forming both a statistically and spatially orthogonal base, but it seems that the latter property has not been exploited by the various authors who have worked on the subject. It is precisely this property that allows result interpretation tools to be constructed.

Let $$F = [f_i^\alpha]_{i=1,n}^{\alpha=1,J}$$

be the rectangular table of the measurements of the J factorial components of the SCA (in columns) on the n individuals (in rows).

The initial variables being centered, the factorial components also are. The matrix $C_{FF}$ of the variances-covariances of F is written as follows:

$$C_{FF} = F^t F = I_J \qquad (8)$$

where $I_J$ is the identity matrix J×J. The matrix of the local variances-covariances (variograms-crossed variograms) associated with the factorial components is written as follows:

$$\Gamma_{FF}(h) = \Lambda \qquad (9)$$

where $\Lambda$ is the diagonal matrix of the eigenvalues $(\lambda_\alpha)_{\alpha=1,\ldots,J}$.

In other words, the correlation coefficient of two components $f^\alpha$ and $f^\beta$ is written as follows:

$$cor(f^\alpha, f^\beta) = \begin{cases} 1 & si \ \alpha = \beta \\ 0 & sinon, \end{cases} \qquad (10)$$

and their crossed variogram:

$$\gamma_{f^\alpha f^\beta}(h) = \begin{cases} \lambda_\alpha & si \ \alpha = \beta \\ 0 & sinon \end{cases} \qquad (11)$$

The spatial components are thus orthonormal. Furthermore, their local variances—values of their variograms for the distance h—are equal to the eigenvalues of the analysis. Their local covariances—values of their crossed variograms for the distance h—are zero two by two. They are thus spatially independent. Interesting relations can thus be deduced therefrom concerning the splitting up of the local variances-covariances matrix—variograms-crossed variograms—of the initial variables. It can be shown its general term can be written in the following form:

$$\gamma_{jj'}(h) = \sum_\alpha cor(Z^j, f^\alpha) cor(Z^{j'}, f^\alpha) \lambda_\alpha \qquad (12)$$

and more particularly the variogram of variable $Z^j$:

$$\gamma_j(h) = \sum_\alpha cor^2(Z^j, f^\alpha) \lambda_\alpha \qquad (13)$$

And since $$\sum_\alpha cor^2(Z^j, f^\alpha) = 1,$$

the local variance (value of the variogram for distance h) of a regionalized variable $Z^j$ is written as an average weighted by $cor^2(Z^j, f^\alpha)$ of the local variances (values of the variograms for distance h) of the spatial components $f^\alpha$ of the SCA.

Considering relation (13), the local variances-covariances matrix—variograms-crossed variograms—is generally written in the following form:

$$\Gamma_{ZZ}(h) = C_{FZ}^t \Lambda C_{FZ} \qquad (14)$$

where $\Lambda$ is the diagonal matrix of the eigenvalues of $C_{ZZ}^{-1}\Gamma_{ZZ}(h)$ and $C_{FZ}$ that of the covariances between the factorial components $f^\alpha$ (in rows) and the initial variables $Z^j$ (in columns).

II-3 Tools Helping Towards Interpretation of the Results of a SCA

In the description hereafter, it is assumed that the SCA analysis has been applied for a predetermined vector h of the data position plane. All the results (eigenvalues $\lambda_\alpha$, factorial components $f^\alpha$, etc) of the SCA thus depend on this vector h.

The definition of $\lambda_j(h)$ in (13) shows that the expression that is defined as follows:

$$cnt(Z^j, f^\alpha) = cor(Z^j, f^\alpha) \cdot |cor(Z^j, f^\alpha)| \cdot \frac{\lambda_\alpha}{\gamma_j(h)} \quad (15)$$

ranges between −1 and 1. It measures the signed contribution of the αth factorial component to the spatial structure (or variability) of variable $Z^j$. Such a definition allows to have both negative and positive values of the contribution, thus conferring a role identical to that of the correlation thereon. It is thus profitable to represent the initial variables on circles called contribution circles (circle of radius 1, FIG. 3) which are used like the correlation circles (FIG. 2) used in the principal-components analysis.

It may be noted that, for any variable $Z^j$ $$\sum_{\alpha=1}^{J} |cnt(Z^j, f^\alpha)| = 1 \quad (16)$$

In fact, if $|cnt(Z^j, f^\alpha)| \approx 1$, it can be said that component $f^\alpha$ greatly contributes to the local variance (or spatial variability) of variable $Z^j$.

The spatial contributions circle allows the typology of the initial variables to be achieved with a greater accuracy.

Furthermore, it is defined:

$$cnt(f^\alpha) = \frac{\sum_{j=1}^{J} cor^2(Z^j, f^\alpha)\lambda_\alpha}{\sum_{j=1}^{J} \gamma_j(h)} = \frac{\sum_j |cnt(Z^j, f^\alpha)| \cdot \gamma_j(h)}{\sum_j \gamma_j(h)} \quad (17)$$

This expression, which ranges between 0 and 1, measures the contribution of the αth factorial component to the spatial structure (or variability) of the data. This contribution is all the higher that $cnt(f^\alpha) \approx 1$. In the denominator of the second term of relation (17), $$\sum_{j=1}^{J} \gamma_j(h) = \text{trace } [\Gamma_{ZZ}(h)]$$

represents the total local variance of the data. The numerator of the third term of expression (17) shows that the contribution of a spatial component to the spatial variability of the data is a sum of the local variances of the initial variables weighted by the absolute contributions $|cnt(Z^j, f^\alpha)|$ of the component to the spatial variability of the variables. The spatial structure of a variable is thus all the more significant that the value of $cnt(Z^j, f^\alpha)$ is high in absolute value.

The first term $cnt(Z^j, f^\alpha)$ is useful, on the one hand, for interpretation of the factorial components as a function of the initial variables and, on the other hand, for the typology thereof. A variable $Z^j$ which, from a spatial viewpoint, bears the greatest resemblance to component $f^\alpha$ is the variable for which the value of $|cnt(Z^j, f^\alpha)|$ is close to 1. Such a result is visualized, as shown above, by means of the contributions circle by representing the initial variables on a factorial plane $(f^\alpha, f^\beta)$ by their co-ordinates $cnt(Z^j, f^\alpha)$ and $cnt(Z^j, f^\beta)$.

The second term $cnt(f^\alpha)$ is a global measurement of the spatial variability given by each component. It is a descriptor of the spatial information borne by the structures shown. This criterion is useful, as described below, for selection of the most significant components. It is on the basis of this criterion, and no longer of the eigenvalues, that the factorial components are arranged in descending spatial contributions. However, these terms are not sufficient to describe the data globally. They do not take account of the variance of the data which is essential for measuring the part of the statistical information given by the components.

The following term is therefore taken:

$$cntV(Z^j, f^\alpha) = cor(Z^j, f^\alpha) \cdot |cor(Z^j, f^\alpha)| \quad (18)$$

which ranges between −1 and 1, and measures the signed contribution of the αth factorial component to the variance of variable $Z^j$. The definition of such a term results from the fact that $$\sum_{\alpha=1}^{J} cor^2(Z^j, f^\alpha) = 1$$

because the initial variables are centred and reduced.

More generally, expression $$cntV(f^\alpha) = \frac{\sum_j cor^2(Z^j, f^\alpha) \cdot \sigma_j^2}{\sum_j \sigma_j^2} = \frac{\sum_j |cntV(Z^j, f^\alpha)| \cdot \sigma_j^2}{\sum_j \sigma_j^2} \quad (19)$$

which ranges between 0 and 1, measures the contribution of the αth factorial component to the variance of the data. Therefore, for each component, the measurement of the variance part of the data is explained thereby. In relation (19), the denominator $$\sum_j \sigma_j^2 = \text{trace } [C_{ZZ}]$$

of the second term represents the total variance of the data.

For want of the eigenvalues directly available with the PCA analysis, the values of $cntV(f^\alpha)$ gives information about the variance part borne by the spatial components resulting from the SCA. The greater $cntV(f^\alpha)$, the more $f^\alpha$ could be comparable to a principal component of the PCA (high variance explained). In practice, there is a strong correlation between the first component $g^1$ of the PCA and the component of the SCA for which $cntV(g^1)=\sigma_1^2$. Moreover, it is shown that $$cnt(g^\alpha) = \frac{\sigma_{g^\alpha}^2}{\sum_{\alpha=1}^{J} \sigma_{g^\alpha}^2},$$

a percentage of the inertia explained by the αth principal component $g^\alpha$ of the PCA.

Furthermore, the greater $cnt(f^\alpha)$, the more the component expresses a high spatial variability of the data. It is consequently useful to arrange the components $f^\alpha$ of the SCA in descending order of the $cnt(f^\alpha)$, i.e.:

$$cnt(f^{\beta(1)}) \geq \ldots \geq cnt(f^{\beta(J)}) \quad (20)$$

and, on the other hand, in descending order of the $cntV(f^\alpha)$, i.e.:

$$cntV(f^{\alpha(1)LI}) \geq cntV(f^{\alpha(2)}) \geq \ldots \geq cntV(f^{\alpha(J)}) \quad (21)$$

FIGS. 5 and 6 show the respective diagrams of the contributions $cnt(f^\alpha)$ and $cntV(f^\alpha)$ of the components to the spatial variability of the data and to the variance of the data.

The q first components kept in relation (20) are referred to as local components because they account for the small-scale data structure, whereas the p first components kept in relation (21) are referred to as regional components because they express the large-scale data structure.

Some components may be both regional and local. The components $f^\alpha$ which are last both in relations (20) and (21), i.e. for which we have both $cnt(f^\alpha) \approx 0$ and $cntV(f^\alpha) \approx 0$, are little significant and are considered as random noise.

The part of the spatial variability of the data explained by the q first local components is:

$$S_{local} = \sum_{k=1}^{q} cnt(f^{\beta(k)}) \tag{22}$$

The part of the variance of the data explained by the p first regional components is $$\vartheta_{regional} = \sum_{k=1}^{p} cntV(f^{\alpha(k)}) \tag{23}$$

The necessary condition for calculating the contributions $cntV(f^\alpha)$ for a family of factorial components is that the latter must be orthogonal.

The contribution to the spatial variability $cnt(g^\alpha)$ cannot be reciprocally integrated as a tool helping towards interpretation of the components of the principal-components analysis PCA. For computation of $cnt(g^\alpha)$, the $g^\alpha$ must be spatially orthonormal (i.e. their local covariances are zero two by two). This is the case of the components of the SCA, but not of the PCA.

The factorial components, both statistically orthogonal and spatially independent, resulting from the method according to the invention, allow accounting for the spatial structures intrinsic in the data. Once shown, these structures can be used for fine description of the seismic images.

II-4 Initial Variables Filtering

One or more regional parts $z_{regional}^j(h)$ representing large-scale spatial phenomena and one or more local parts $Z_{local}^j(h)$ representing small-scale spatial phenomena can respectively be extracted from any initial variable $Z^j$. These new variables are written as follows:

$$Z_{regional}^j(h) = \sum_{regional\ comp.\ k} r_k^j f^k \tag{24}$$

and $$Z_{local}^j(h) = \sum_{local\ comp.\ k} r_k^j f^k \tag{25}$$

The regional and local components that appear in relations (24) and (25) are selected by the user on the basis of the diagrams of contributions of the spatial components to the variance and to the spatial variability of the data.

Example of Application of the SCA to a Data Set

The six images Z1, ..., Z6 in FIGS. 1a to 1f represent the amplitudes of the six horizons of a seismic block. Three structures can be seen in these images, some of which are intertwined: a structure of East-West orientation common to images Z1, Z2 and Z3, a structure of North-South orientation common to images Z4, Z5 and Z6, and random noise mixed with the two North-East and East-West structures mainly in images Z2, Z4 and Z6. The East-West and North-South structures are large-scale spatial arrangements whereas the random noise rather appears on a smaller scale.

Besides, although structurally alike, images Z1, Z2 and Z3 (respectively Z4, Z5 and Z6) exhibit weak correlations with each other because of the apparent shift of the lenses forming each of the images as shown in the correlation table hereafter. This weak correlation makes separation of these structures difficult or even impossible by means of a conventional multivariable method (such as the PCA) based only on the correlations between the variables.

|    | Z1    | Z2    | Z3    | Z4    | Z5    | Z6    |
|----|-------|-------|-------|-------|-------|-------|
| Z1 | 1.00  | −0.26 | 0.11  | −0.11 | 0.05  | −0.02 |
| Z2 | −0.26 | 1.00  | 0.14  | 0.27  | 0.07  | 0.41  |
| Z3 | 0.11  | 0.14  | 1.00  | −0.05 | 0.13  | 0.00  |
| Z4 | −0.11 | 0.27  | −0.05 | 1.00  | −0.15 | 0.17  |
| Z5 | 0.05  | 0.07  | 0.13  | −0.15 | 1.00  | 1.00  |
| Z6 | −0.02 | 0.41  | 0.00  | 0.17  | 0.02  | 1.00  |

The variograms of the six images in eight directions (North-South, N220, N450, N670, East-West, N67E, N45E and N22E) are shown in FIGS. 2a to 2h. Some directions (N450 and N45E) do not allow to distinguishing the six images from one another, whereas the North-East and East-West directions separate the curves better and show two homogeneous and well-separated spatial behaviour families. The periodicities of the horizontal events (images Z1, Z2 and Z3) and of the vertical events (Z4, Z5 and Z6) appear on the corresponding variograms. These variograms even give a measurement of this periodicity ($\approx$35 meters).

It can also be noted that the skip in the neighborhood of the origin (for all the variograms) is different from one image to the other. The latter are arranged in ascending order of the value at the origin as follows: Z1, Z5, Z3, Z2, Z4 and Z6. It is precisely in this order that the images are arranged from those comprising the least noise to those with the most noise.

If the SCA is to be applied in order to separate the spatial noise of the two other large-scale structures, without distinction between these two structures, the distance near the origin has to be selected.

On the other hand, if these two large-scale structures are to be separated, the SCA should be applied in the North-South or East-West direction for a distance of 18 meters which corresponds to the distance for which separation between the two image families is optimum. The SCA will be applied for the 18-meter distance in the North-South direction.

Figure 3A:
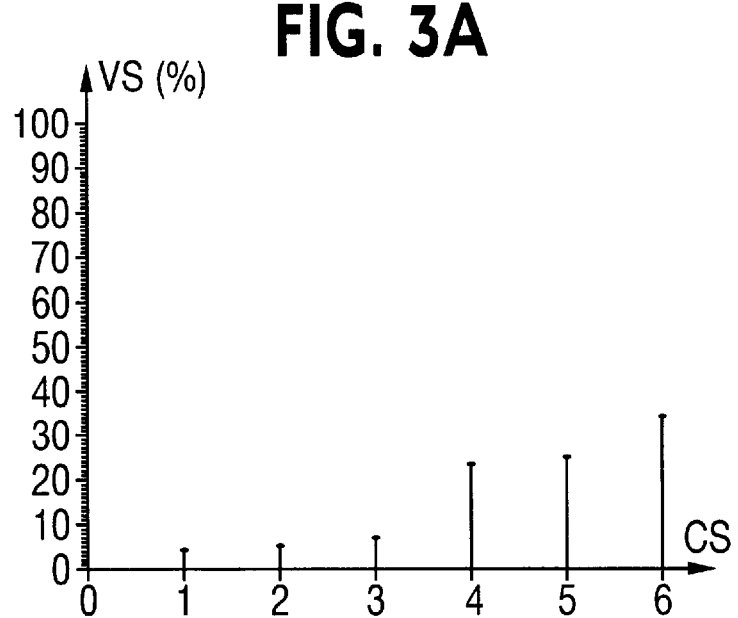
FIGS. 3a, 3b show two diagrams of the contributions of spatial components CS respectively to the spatial variability (VS) and to the variance (V) of the data, FIGS. 4a to 4f respectively show the spatial components (F1–F6) of various structures.
Figure 3B:
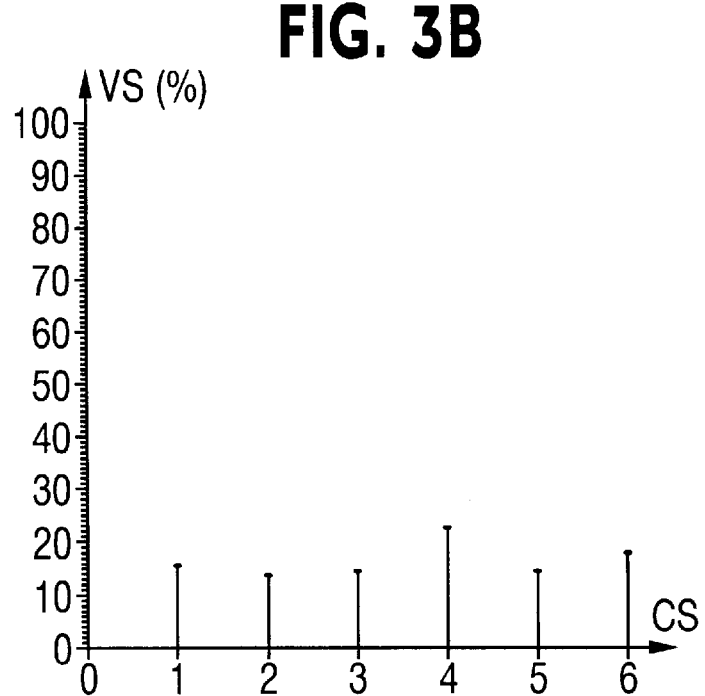

It can be noted, in FIGS. 3a, 3b which give the eigenvalues and the diagrams of contributions to the spatial variability and to the variance of the 6 spatial components, that the components have approximately equivalent variance contribution values. It is then the spatial variability criterion that is pertinent for distinguishing the spatial components from one another. Components F4, F5 and F6 are thus shown to be significant.

Figure 4A:
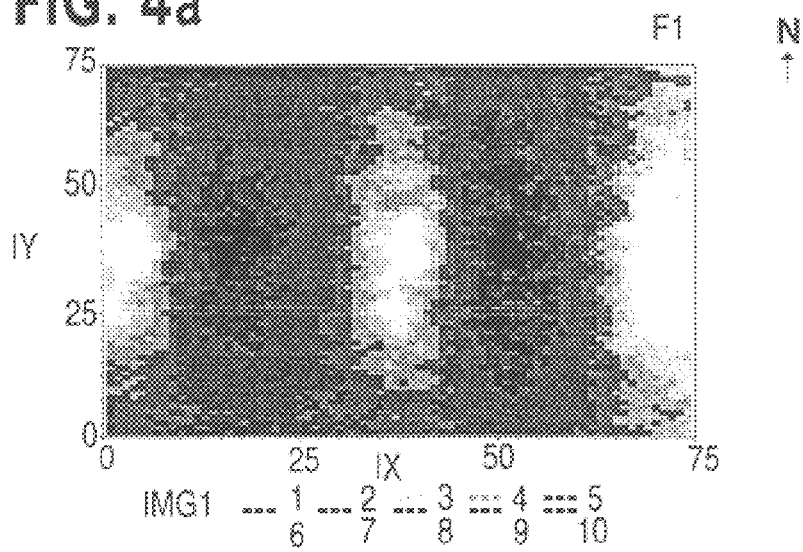
Figure 4B:
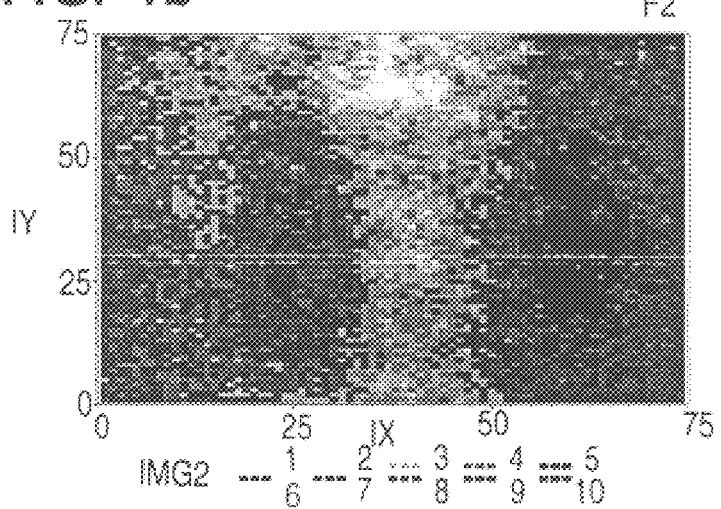
Figure 4C:
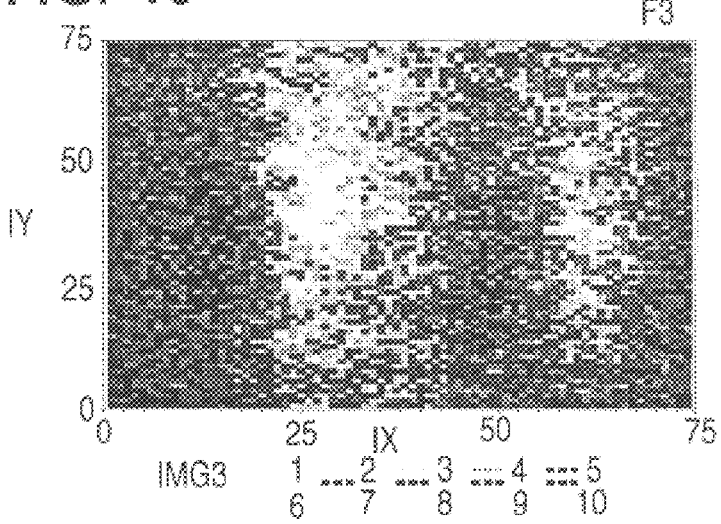
Figure 4D:
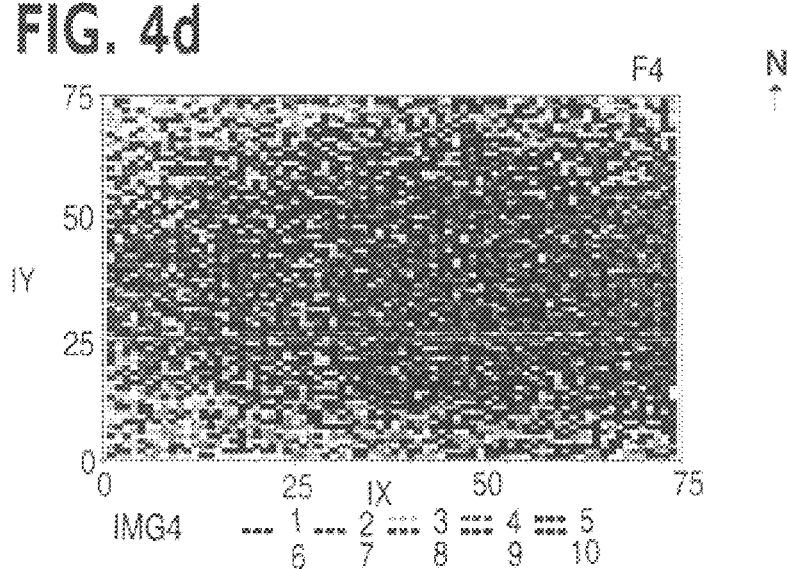
Figure 4E:
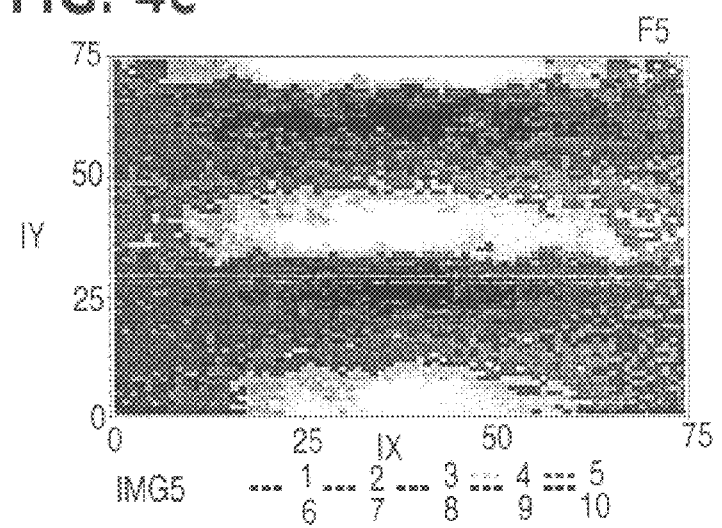
Figure 4F:
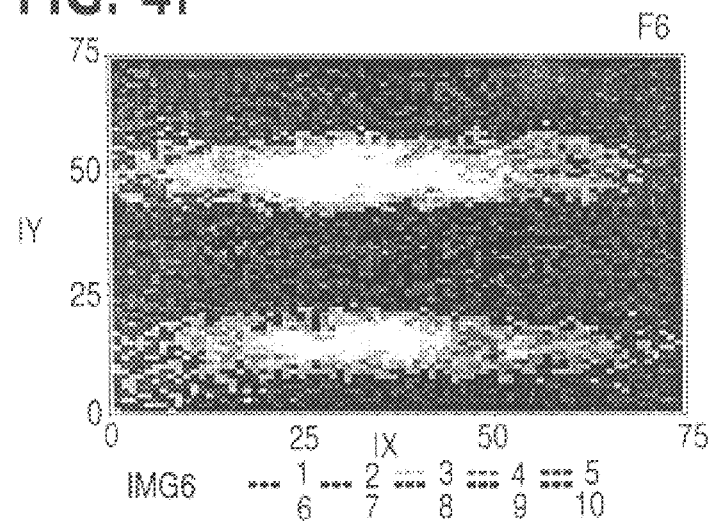
Figure 5A:
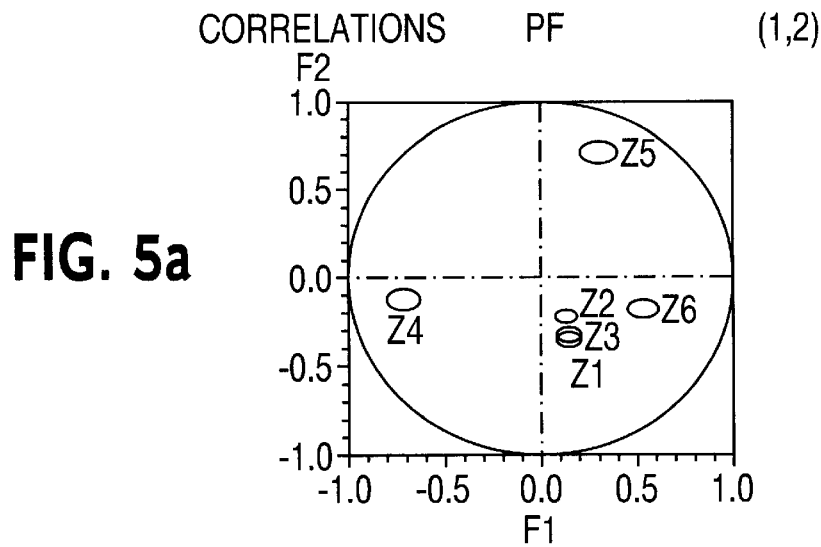
FIGS. 5a to 5e show representations of the initial variables on circles of correlations associated with five factorial planes (PF(1,2) to PF(5,6))
Figure 5B:
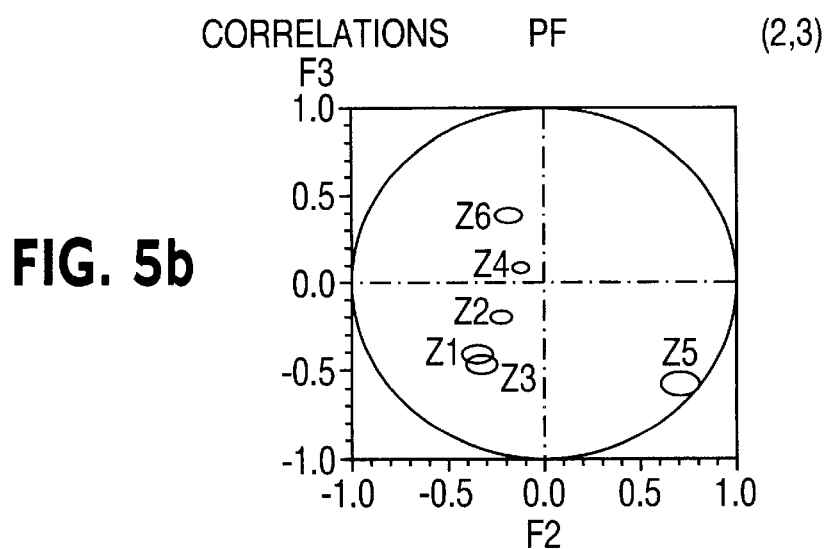
Figure 5C:
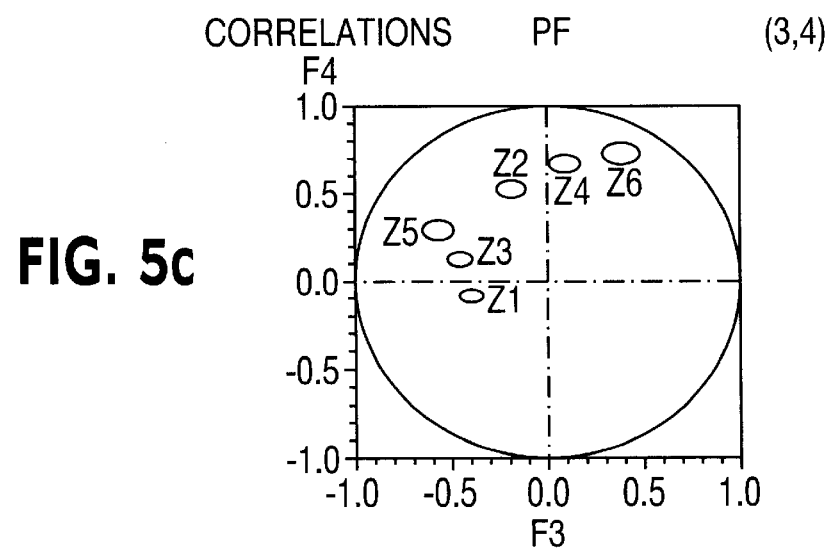
Figure 5D:
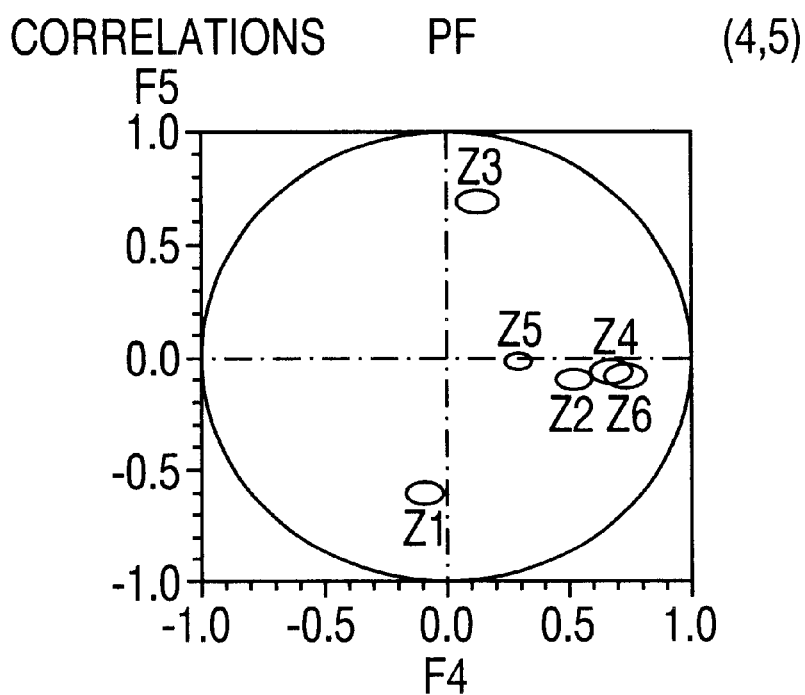
Figure 5E:
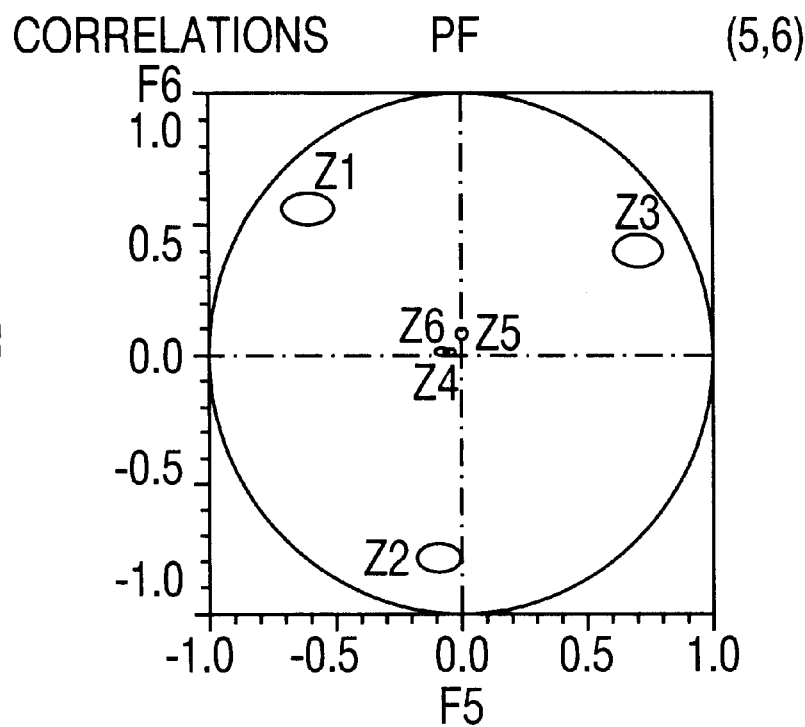
Figure 6A:
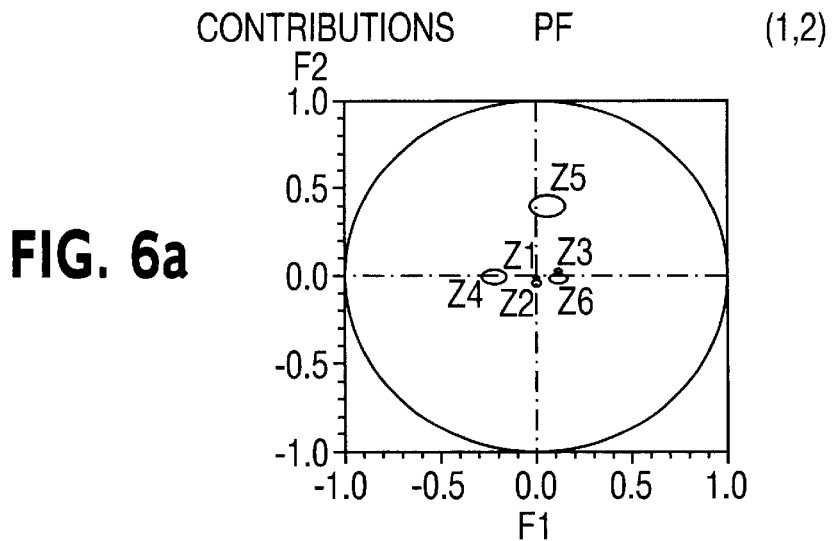
FIGS. 6a to 6e show representations of the initial variables on circles of contributions associated with the factorial plane (PF(1,2) to PF(5,6))
Figure 6B:
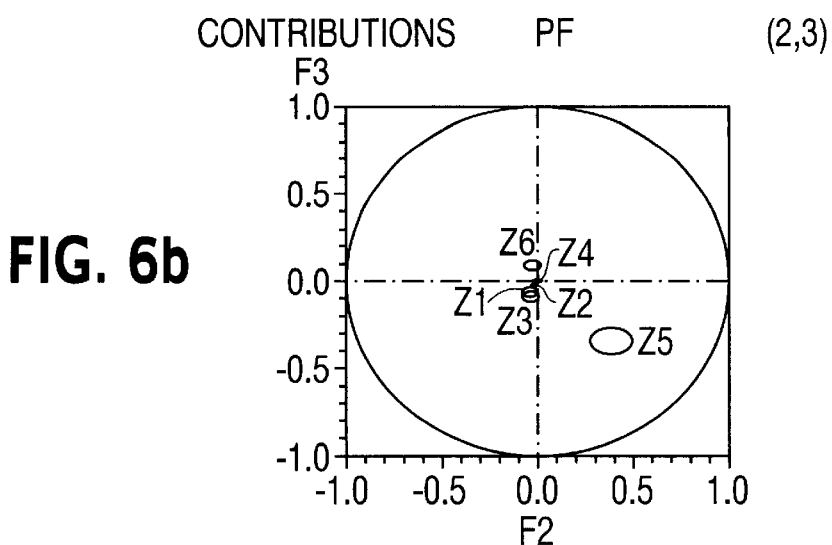
Figure 6C:
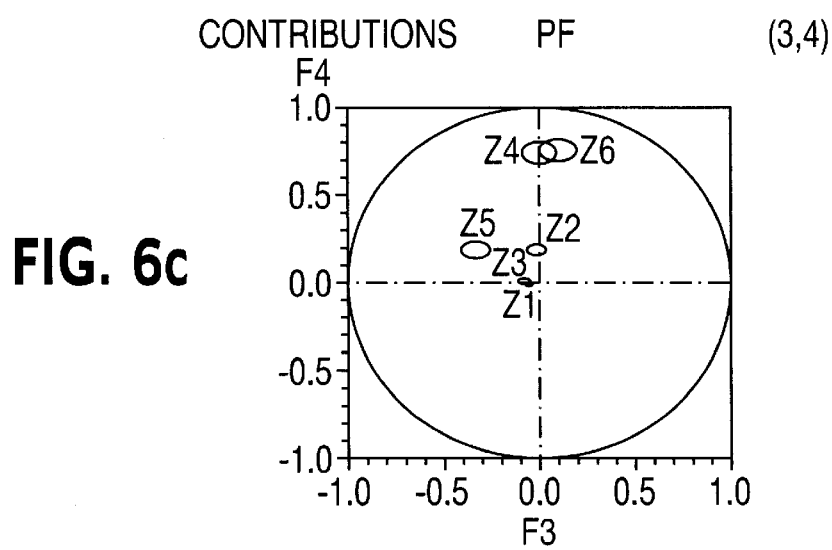
Figure 6D:
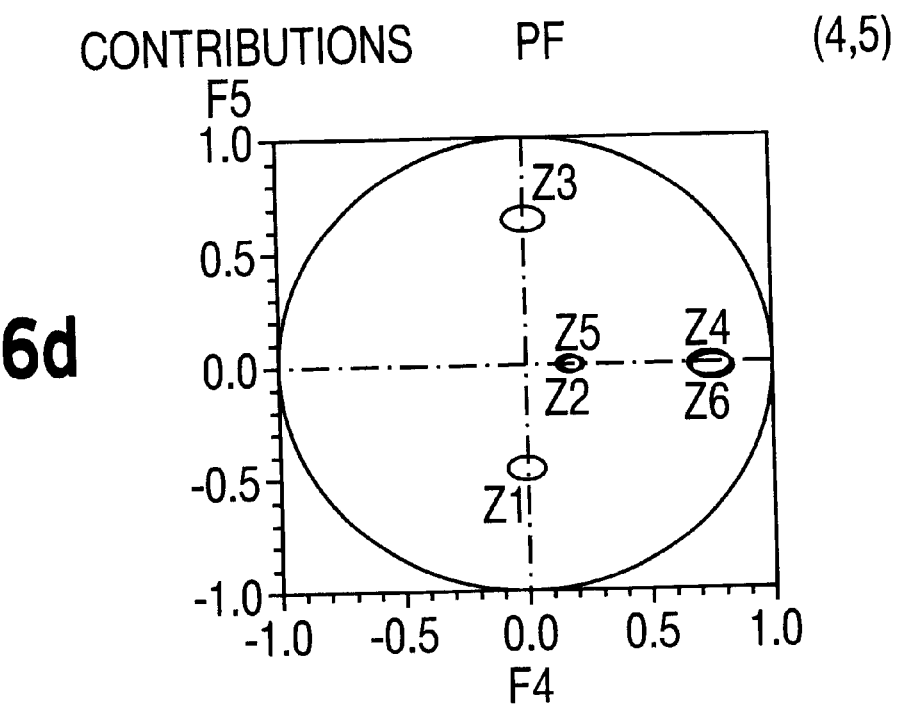
Figure 6E:
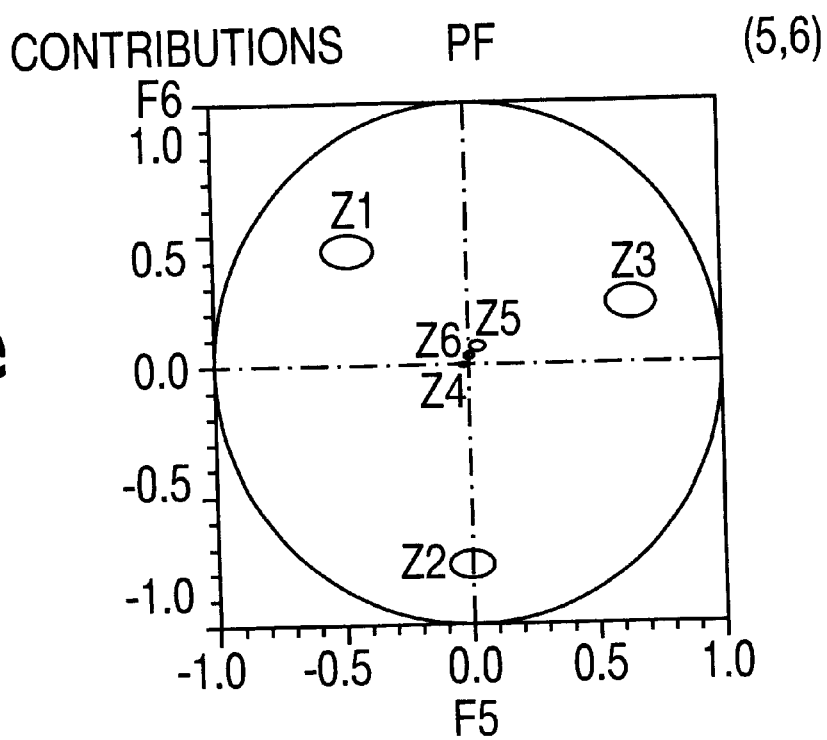

Components F5 and F6 (FIGS. 4e and 4f) show the East-West structures, whereas F1 and F2 (FIGS. 4a, 4b) show the North-South structures. Component F3 (FIG. 4c) mixes the North-South structure with the random noise. Component F4 (FIG. 4d) captures the random noise and separates it completely from the other structures.

The graph types in FIGS. 5a to 5e and FIGS. 6a to 6e (correlations and contributions to the spatial variability of the variables) allow to position the initial images in relation to the spatial components. This positioning has a function of interpretation of the data (initial data and components) in relation to each other. The factorial planes (F5–F6), for the correlations (FIGS. 5a–5e) and for the contributions (FIGS. 6a–6e) as well, thus show that components F5 and F6 are strongly correlated with (and greatly contribute to) images Z1, Z2 and Z3. Similarly, the high spatial variability of images Z2, Z4 and Z6 can be seen thanks to spatial component F4.

Figure 7A:
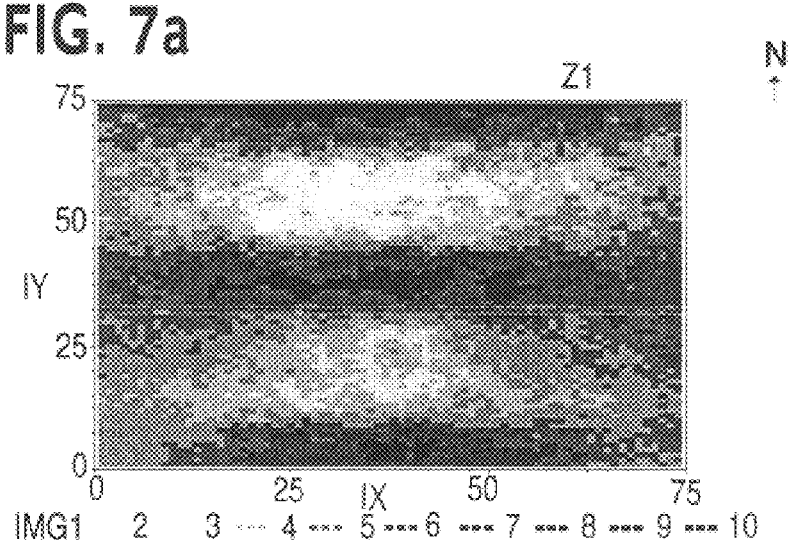
FIGS. 7a to 7f show, on the initial images Z1 to Z6, the component structure F5–F6 corresponding to the spatial structure East-West.
Figure 7B:
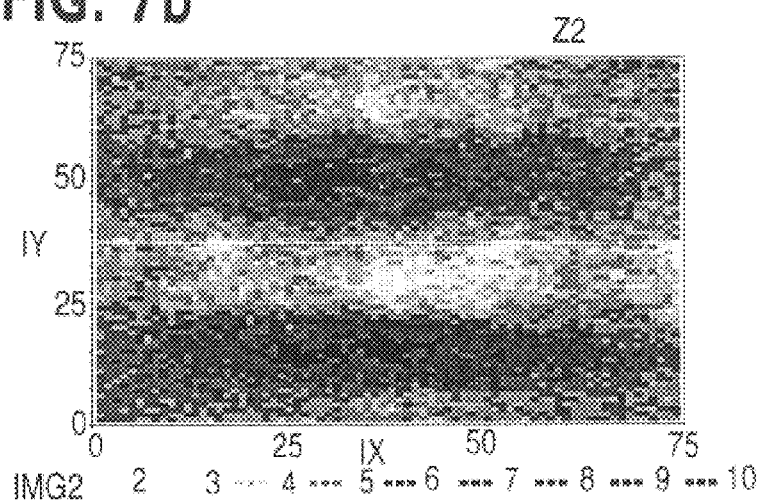
Figure 7C:
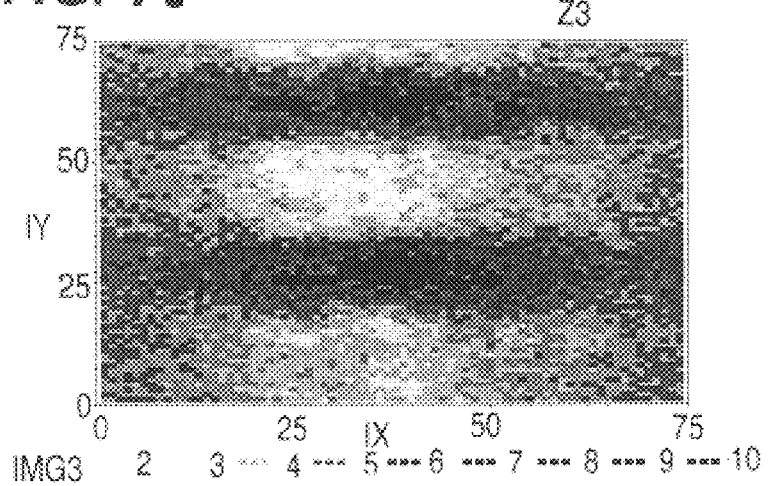
Figure 7D:
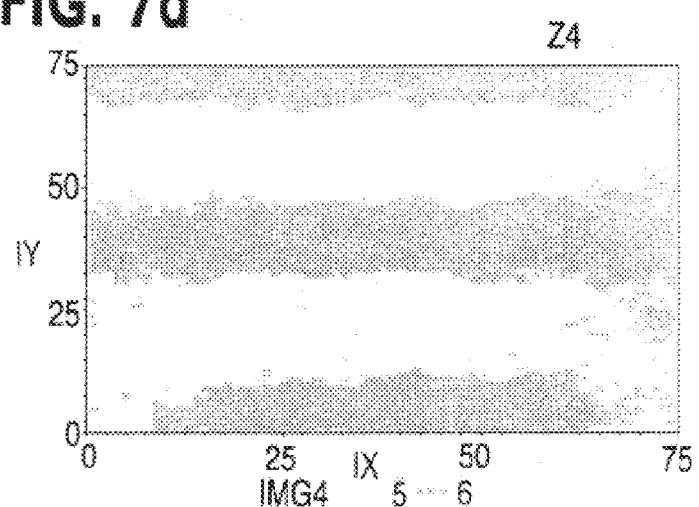
Figure 7E:
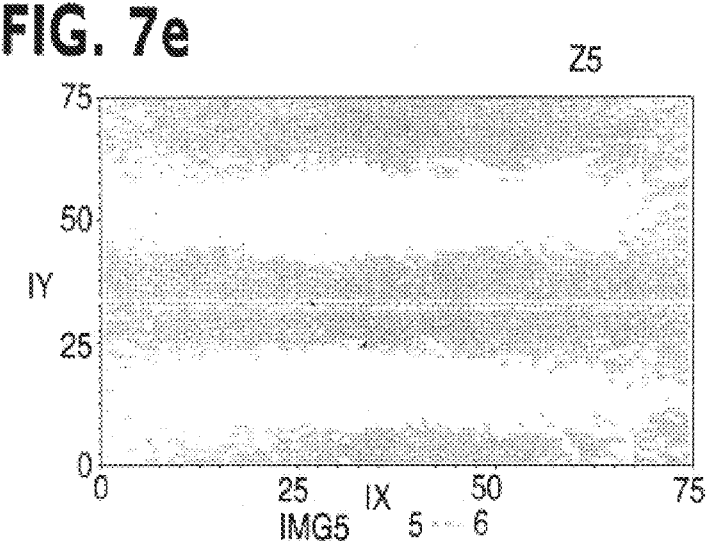
Figure 7F:
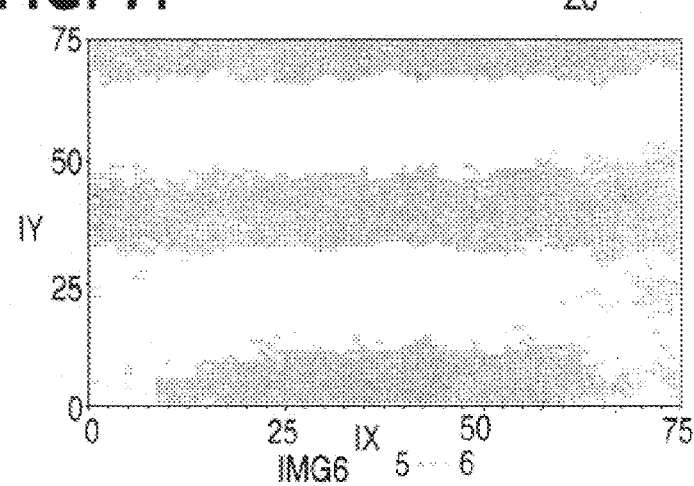

The component structure F5–F6 corresponds to the East-West spatial structure. The latter is mainly contained in images Z1, Z2 and Z3 (FIGS. 7a–7c). The images in FIGS. 7a to 7f correspond to the extraction of this structure from the initial images. It can be noted that those which contain it (Z1, Z2 and Z3) provide a large part thereof, whereas the others (Z4, Z5 and Z6) only give a negligible amount of it (FIGS. 7d to 7f).

Figure 8A:
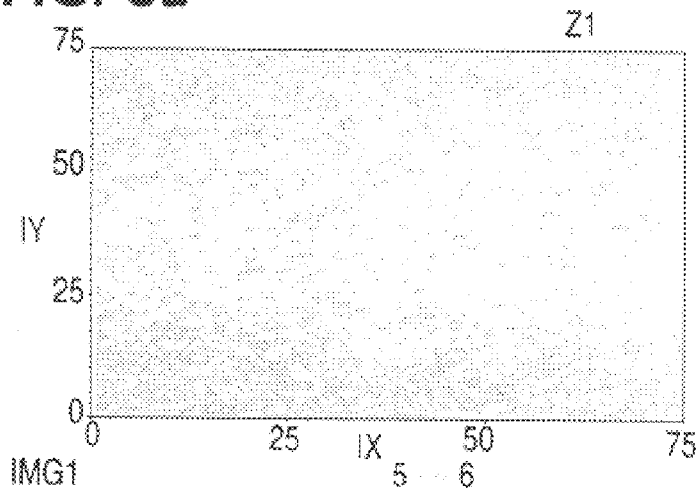
FIGS. 8a to 8f show the random noise on the initial images Z1 to Z6.
Figure 8B:
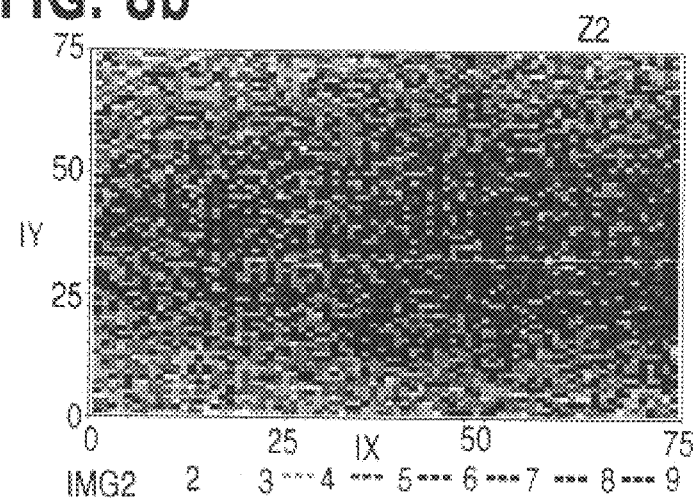
Figure 8C:
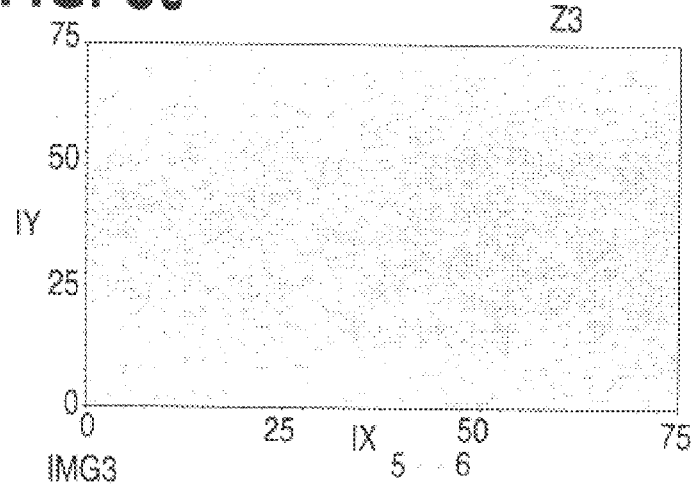
Figure 8D:
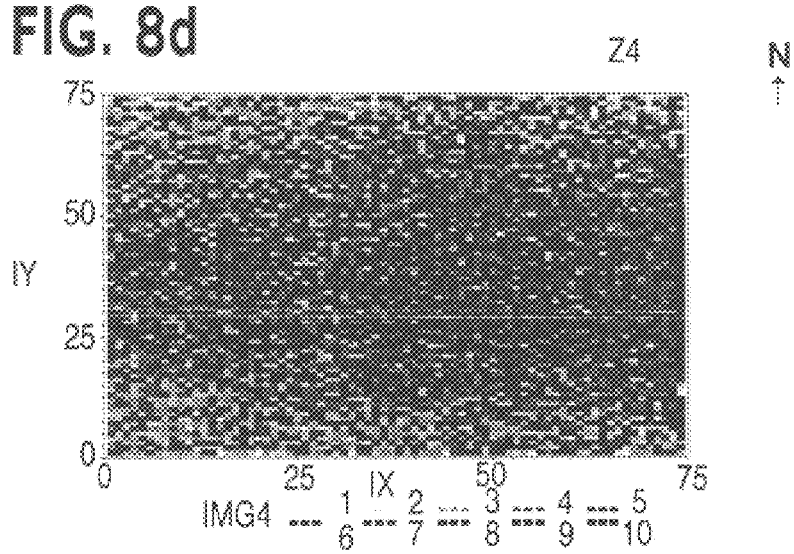
Figure 8E:
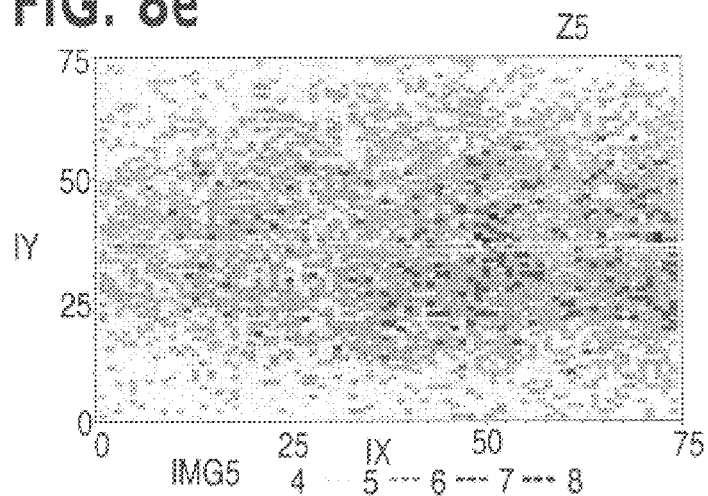
Figure 8F:
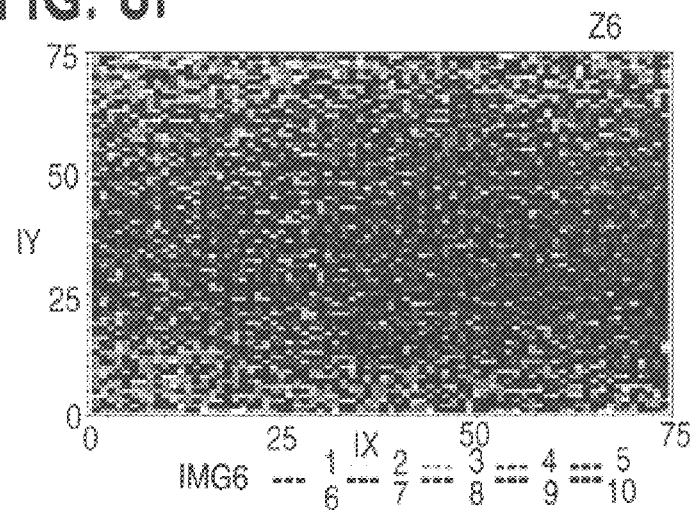

Structure F4 corresponds to the random noise. The images of FIGS. 8a to 8f show this noise contained in each of the initial images, mainly in images Z2, Z4 and Z6 (FIGS. 8b, 8d and 8f respectively).

The table hereunder gives the spatial variability (cnt) and variance (cntV) percentage values of the component structures F5–F6 and F4 contained in the initial images. These values allow to select the initial images according to the component structures shown.

|    | Extraction of component structure F5–F6 | | Extraction of component structure F4 | |
|----|---------|---------|---------|---------|
|    | cnt %   | cntV %  | cnt %   | cntV %  |
| Z1 | 90%     | 69%     | 1%      | 1%      |
| Z2 | 78%     | 62%     | 19%     | 28%     |
| Z3 | 88%     | 65%     | 1%      | 2%      |
| Z4 | 1%      | 0%      | 75%     | 46%     |
| Z5 | 3%      | 1%      | 19%     | 9%      |
| Z6 | 2%      | 1%      | 76%     | 53%     |

Examples of application of the method to the characterization of a volume of the subsoil have been described. It is however obvious that the method can also be applied more generally to the characterization of any spatial data where units connected by spatial continuity graphs are to be processed. The method can find applications for example, and without any limitations, in all the geosciences, notably in geography, agronomy, hydrology, geomarketing, etc.

In the examples described above, objects (image elements) with an even spatial distribution have been considered. It is however obvious that the method applies to objects having any spatial distribution.

I claim:

1. A multivariable statistical method for analyzing data associated with initial images representing distributed elements in an environment, the data being obtained by exploration of the environment, so as to identify spatial relations between spatial structures of the initial images, comprising:

performing a spatial analysis of the data to show spatial properties of the distributed elements in multiple directions;

analyzing the data by a spatial contiguity analysis to provide a split thereof into spatial components showing the spatial structures of the initial images; and filtering the spatial structures obtained by the spatial contiguity analysis to extract spatial structures; and wherein spatial contiguity analysis is defined as a computation of a family of linear combination components of initial variables which minimize a contiguity coefficient defining a ratio of spatial variability to a variance.

2. A method in accordance with claim 1 wherein:

the elements are subsoils of the environment.

3. A method in accordance with claim 1, wherein:

the split is a best split and the spatial structures are most pertinent spatial structures.

4. A method in accordance with claim 2, wherein:

the split is a best split and the spatial structures are most pertinent spatial structures.

5. A method as claimed in claim 1, comprising:

identifying the spatial structures; and filtering the initial images to suppress noise therein and selecting at least one identified spatial structure.

6. A method as claimed in claim 2, comprising:

identifying the spatial structures; and filtering the initial images to suppress noise therein and selecting at least one identified spatial structure.

7. A method as claimed in claim 3, comprising:

identifying the spatial structures; and filtering the initial images to suppress noise therein and selecting at least one identified spatial structure.

8. A method as claimed in claim 4, comprising:

identifying the spatial structures; and filtering the initial images to suppress noise therein and selecting at least one identified spatial structure.

9. A method as claimed in claim 1, comprising:

identifying the spatial structure of the initial images by analysis of different variograms of at least one distributed element.

10. A method as claimed in claim 2, comprising:

identifying the spatial structure of the initial images by analysis of different variograms of at least one distributed element.

11. A method as claimed in claim 3, comprising:

identifying the spatial structure of the initial images by analysis of different variograms of at least one distributed element.

12. A method as claimed in claim 4, comprising:

identifying the spatial structure of the initial images by analysis of different variograms of at least one distributed element.

13. A method as claimed in claim 5, comprising:

identifying the spatial structure of the initial images by analysis of different variograms of at least one distributed element.

14. A method as claimed in claim 6, comprising:

identifying the spatial structure of the initial images by analysis of different variograms of at least one distributed element.

15. A method as claimed in claim 7, comprising:

identifying the spatial structure of the initial images by analysis of different variograms of at least one distributed element.

16. A method as claimed in claim 8, comprising:

identifying the spatial structure of the initial images by analysis of different variograms of at least one distributed element.

17. A method as claimed in claim 9, comprising:
performing a monovariable variographic analysis of at least one distributed element.
18. A method as claimed in claim 10, comprising:
performing a monovariable variographic analysis of at least one distributed element.
19. A method as claimed in claim 11, comprising:
performing a monovariable variographic analysis of at least one distributed element.
20. A method as claimed in claim 12, comprising:
performing a monovariable variographic analysis of at least one distributed element.
21. A method as claimed in claim 13, comprising:
performing a monovariable variographic analysis of at least one distributed element.
22. A method as claimed in claim 14, comprising:
performing a monovariable variographic analysis of at least one distributed element.
23. A method as claimed in claim 15, comprising:
performing a monovariable variographic analysis of at least one distributed element.
24. A method as claimed in claim 9, comprising:
performing a bivariable variographic analysis of at least one distributed element.
25. A method as claimed in claim 10, comprising:
performing a bivariable variographic analysis of at least one distributed element.
26. A method as claimed in claim 11, comprising:
performing a bivariable variographic analysis of at least one distributed element.
27. A method as claimed in claim 12, comprising:
performing a bivariable variographic analysis of at least one distributed element.
28. A method as claimed in claim 13, comprising:
performing a bivariable variographic analysis of at least one distributed element.
29. A method as claimed in claim 14, comprising:
performing a bivariable variographic analysis of at least one distributed element.
30. A method as claimed in claim 15, comprising:
performing a bivariable variographic analysis of at least one distributed element.
31. A method as claimed in claim 1, comprising:
selecting the spatial structures by determining respective contributions thereof to spatial variability and to variance thereof.
32. A method as claimed in claim 2, comprising:
selecting the spatial structures by determining respective contributions thereof to spatial variability and to variance thereof.
33. A method as claimed in claim 3, comprising:
selecting the spatial structures by determining respective contributions thereof to spatial variability and to variance thereof.
34. A method as claimed in claim 4, comprising:
selecting the spatial structures by determining respective contributions thereof to spatial variability and to variance thereof.
35. A method as claimed in claim 31, comprising:
graphically performing the selection of the spatial structures.
36. A method as claimed in claim 32, comprising:
graphically performing the selection of the spatial structures.
37. A method as claimed in claim 33, comprising:
graphically performing the selection of the spatial structures.
38. A method as claimed in claim 34, comprising:
graphically performing the selection of the spatial structures.
39. A method as claimed in claim 1, comprising:
quantificating the spatial structures in terms of spatial variability and variance.
40. A method as claimed in claim 2, comprising:
quantificating the spatial structures in terms of spatial variability and variance.
41. A method as claimed in claim 3, comprising:
quantificating the spatial structures in terms of spatial variability and variance.
42. A method as claimed in claim 4, comprising:
quantificating the spatial structures in terms of spatial variability and variance.
43. A method as claimed in claim 1, comprising:
analyzing distributed elements.
44. A method as claimed in claim 2, comprising:
analyzing distributed elements.
45. A method as claimed in claim 3, comprising:
analyzing distributed elements.
46. A method as claimed in claim 4, comprising:
analyzing distributed elements.
47. A method as recited in claim 43 wherein:
the elements are evenly distributed.
48. A method as recited in claim 43 wherein:
the elements are unevenly distributed.

* * * * *